United States Patent
Gomez et al.

(10) Patent No.: US 7,894,790 B2
(45) Date of Patent: Feb. 22, 2011

(54) DUAL CONVERSION RECEIVER WITH REDUCED HARMONIC INTERFERENCE

(75) Inventors: Ramon A. Gomez, San Juan Capistrano, CA (US); Myles Wakayama, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 1381 days.

(21) Appl. No.: 10/984,750

(22) Filed: Nov. 10, 2004

(65) Prior Publication Data

US 2005/0221784 A1    Oct. 6, 2005

Related U.S. Application Data

(60) Provisional application No. 60/558,545, filed on Apr. 2, 2004.

(51) Int. Cl.
H04B 15/00    (2006.01)
H04B 1/26    (2006.01)
(52) U.S. Cl. ............................ 455/314; 455/68; 455/296
(58) Field of Classification Search .................. 455/68, 455/69, 313, 314, 315, 323, 296, 207
See application file for complete search history.

(56) References Cited

U.S. PATENT DOCUMENTS

| | | | |
|---|---|---|---|
| 4,006,420 A | 2/1977 | Schittko | |
| 4,162,452 A | 7/1979 | Ash | |
| 4,340,975 A | 7/1982 | Onishi et al. | |
| 4,408,349 A | 10/1983 | Yukawa | |
| 4,512,035 A * | 4/1985 | Victor et al. | 455/165.1 |
| 4,553,264 A * | 11/1985 | Hasegawa et al. | 455/189.1 |
| 4,858,159 A | 8/1989 | Wheelwright et al. | |
| 5,200,826 A | 4/1993 | Seong | |
| 5,692,279 A | 12/1997 | Mang et al. | |
| 5,737,035 A | 4/1998 | Rotzoll | |
| 5,822,687 A | 10/1998 | Bickley et al. | |
| 5,847,612 A | 12/1998 | Birleson | |
| 5,930,696 A | 7/1999 | Tzuang et al. | |
| 6,011,962 A | 1/2000 | Lindenmeier et al. | |
| 6,163,684 A | 12/2000 | Birleson | |

(Continued)

FOREIGN PATENT DOCUMENTS

EP    0473373 A2    3/1992

*Primary Examiner*—Edward Urban
*Assistant Examiner*—Christian A Hannon
(74) *Attorney, Agent, or Firm*—Sterne, Kessler, Goldstein & Fox P.L.L.C.

(57) ABSTRACT

A dual conversion receiver selects and down-converts one channel from a plurality of channels in a received RF signal. The dual conversion receiver includes first and second mixer stages that are driven by first and second local oscillator signals. Channel selection is performed by tuning the first local oscillator signal so that a desired channel is up-converted to a first IF frequency, which defines the center of the passband of a first bandpass filter connected between the first and second mixer stages. The second mixer stage down-converts the output of the first bandpass filter to a second IF frequency, which is further filtered by a second bandpass filter. The first and second local oscillators can produce harmonics that mix in the second mixer stage, causing unwanted spurious signals that can fall in band with the second IF frequency. In order to avoid interference from these unwanted spurious signals, the frequency step size of the first local oscillator is tuned so that the spurious signals fall out-of-band of the second IF frequency.

20 Claims, 4 Drawing Sheets

U.S. PATENT DOCUMENTS

| | | | |
|---|---|---|---|
| 6,259,752 B1 * | 7/2001 | Domino et al. | 375/346 |
| 6,484,042 B1 | 11/2002 | Loke | |
| 6,697,613 B1 * | 2/2004 | Domino et al. | 455/310 |
| 7,035,614 B2 * | 4/2006 | Dessert et al. | 455/315 |
| 2004/0077323 A1 * | 4/2004 | Taki | 455/207 |
| 2004/0121751 A1 * | 6/2004 | Shen | 455/313 |
| 2005/0215203 A1 * | 9/2005 | Waltho et al. | 455/69 |

* cited by examiner

DUAL CONVERSION RECEIVER WITH REDUCED HARMONIC INTERFERENCE

CROSS REFERENCED TO RELATED APPLICATIONS

This application claims the benefit of U.S. Provisional Application No. 60/558,545, filed on Apr. 2, 2004, which is incorporated by reference herein in its entirety.

BACKGROUND OF THE INVENTION

1. Field of the Invention

The present invention generally relates to reducing harmonic interference from local oscillators in a dual conversion receiver.

2. Background Art

Television signals are transmitted at radio frequencies (RF) using terrestrial, cable, or satellite transmission schemes. Terrestrial and cable TV signals are typically transmitted at frequencies of approximately 57 to 860 MHZ, with 6 MHZ channel spacings in the United States and 8 MHz channel spacing in Europe. Satellite TV signals are typically transmitted at frequencies of approximately 980 to 2180 MHz.

Regardless of the transmission scheme, a tuner is utilized to select and down-convert a desired channel from the TV signal to an intermediate frequency (IF) signal or a baseband signal, which is suitable for processing. The signal may be a television picture in analog or digital format, or digital data (e.g. for a cable modem).

To achieve a high level of image rejection, some TV tuners utilize a dual-conversion architecture having two mixers and two IF filters. The first mixer up-converts the received RF signal to a first IF frequency (e.g. 1220 MHZ) that is fixed above the RF signal band of the incoming TV signal, using a variable local oscillator (LO) signal. An IF filter, centered at the first IF, selects the channel of interest and provides the image rejection to prevent signal interference. The second mixer then down-converts the first IF to a lower frequency second IF, using a second fixed or variable frequency LO signal. The second IF is typically at 36 or 44 MHZ and is selected by a second IF filter with high selectivity that removes any undesired signal interference. Channel selection is realized by adjusting the first LO signal so that the desired channel is up-converted into the passband of the SAW filter, and is then down-converted to the passband of the second IF filter by the second mixer.

All practical local oscillators generate harmonic frequencies, in additional to the intended fundamental frequency. For instance, if the intended fundamental frequency of the local oscillator is 1000 MHz, the local oscillator will also generate frequencies at 2000 MHz, 3000 MHz, and so on, at increasingly reduced amplitudes. One problem with dual conversion tuners, is that harmonics of the first and second local oscillators can mix, for example in the second mixer stage, and fall in the passband of the baseband SAW filter. When this occurs, the unwanted harmonics can interfere with the down-converted channel.

What is needed is a method or apparatus for preventing harmonic interference in the dual conversion receiver.

BRIEF SUMMARY OF THE INVENTION

The present invention is an apparatus and method for reducing harmonic interference in a dual conversion receiver, for example a dual conversion TV tuner. The harmonic interference could be the result of harmonic local oscillator frequency mixing in the dual conversion receiver.

The dual conversion receiver includes a receiver input configured to receive an RF input signal having a plurality of channels. For example, the RF input signal could be a plurality of TV channels. A first mixer having a first input is coupled to the receiver input and a second input is coupled to a first local oscillator signal. The first mixer outputs a desired channel of the plurality of channels at a first IF frequency ($IF_1$). A bandpass filter has an input coupled to an IF output of the first mixer, and has a passband centered at IF1 that passes the desired channel so that it is selected from the plurality of channels. The majority of the remaining channels are substantially rejected by the first bandpass filter. A second mixer has a first input coupled to an output of the bandpass filter and a second input coupled to a second local oscillator signal, where the second mixer outputs the desired channel at a second IF frequency ($IF_2$). Channel selection is performed by tuning the fundamental frequency of the first local oscillator signal so that the desired channel falls in the passband of the bandpass filter. The fundamental frequency of the second local oscillator is determined so that the desired channel is down-converted to the second IF frequency $IF_2$.

As discussed above, the frequency of the first local oscillator signal is tuned for channel selection. Additionally, the frequency step size of the first local oscillator signal is determined so that any spurious signals generated from mixing products of the first local oscillator signal with the second local oscillator signal do not interfere with the desired channel at the second IF frequency ($IF_2$).

Specifically, in one embodiment, the frequency step size of the first local oscillator signal is determined so that the spurious signal represented by $|2 \cdot LO_1 - 3 \cdot LO_2|$, does not interfere with the desired channel at the second IF frequency ($IF_2$), where $2 \cdot LO_1$ represents the second harmonic of the first local oscillator signal, and $3 \cdot LO_2$ represents the third harmonic of the second local oscillator signal. Even more specifically, the frequency step size of the first local oscillator is set to 10.35 MHz so as to avoid spurious signal interference for a 36 MHz or a 44 MHz second IF signal.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1A:
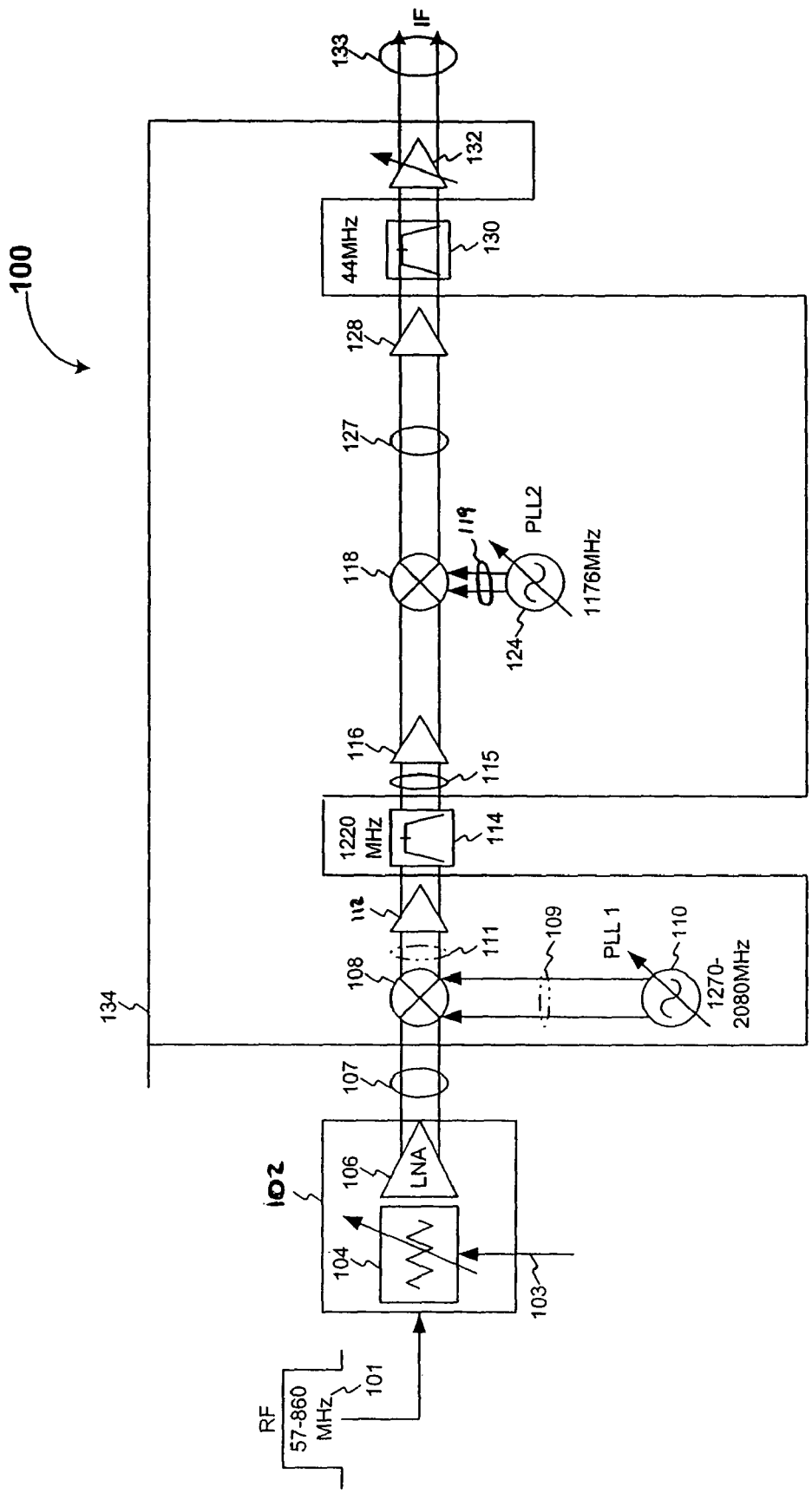
FIG. 1A illustrates a dual conversion receiver.

FIG. 1A illustrates a schematic of a tuner assembly 100 that has an automatic gain control circuit (AGC) 102 and a tuner 134.

The tuner assembly 100 receives an RF input signal 101 having multiple channels and down-converts a selected channel to an IF frequency, to produce an IF signal 133. For instance, the RF input signal 101 can include multiple TV channels that typically have 6 MHZ frequency spacings and cover a range of 54-860 MHZ, and where the selected channel is down-converted to an IF frequency at 44 MHZ, 36 MHZ or some other desired IF frequency for further processing. The frequencies listed herein are not meant as a limitation and are provided for example purposes only. The structure and operation of the tuner assembly 100 are described in further detail below.

The AGC circuit 102 provides automatic gain control using a variable resistor 104 and a low noise amplifier (LNA) 106. The variable resistor 104 attenuates the RF input signal 101 according to a control signal 103. In embodiments, the control signal 103 is based on the signal amplitude of the IF signal 133 so that the RF front-end gain can be adjusted to achieve a desired amplitude for the IF signal 133. The LNA 106 provides low noise amplification and converts a single-ended input signal to a differential RF signal 107.

The tuner 134 has a dual conversion architecture (one up-conversion, and one down-conversion) that includes an up-convert mixer 108 and a down-convert mixer 118. The up-convert mixer 108 is driven by a first phase locked loop (PLL) 110 that has coarse tuning capability from 1270-2080 MHz. The down-convert mixer 118 is driven by a second PLL 124 that has a relatively fixed frequency of 1176 MHZ (for a 44 MHZ IF) and has fine frequency tuning capability. For example, in embodiments, the second LO is tunable by ±5 MHz. Two separate off-chip surface acoustic wave (SAW) IF bandpass filters 114 and 130 are used to perform IF filtering in the tuner 134. However, other bandpass filters besides SAW filters could be used for the filters 114 and 130 (including on-chip lumped element bandpass filters) as will be understood by those skilled in the arts. The first IF filter 114 is connected between the up-convert mixer 108 and the down-convert mixer 118. The passband of the SAW filter 114 is centered at 1220 MHZ, and is preferably only a few channels wide (e.g. 1-2 channels wide or 12 MHZ for 6 MHZ TV channel spacings), and can be referred to as a channel selection filter. The second IF filter 130 has a passband at 44 MHZ and is coupled to the output of the amplifier 128. Additionally, various on-chip amplifiers 112, 116, 128, and 132 are included throughout the tuner 134 to provide signal amplification, as necessary.

Figure 1B:
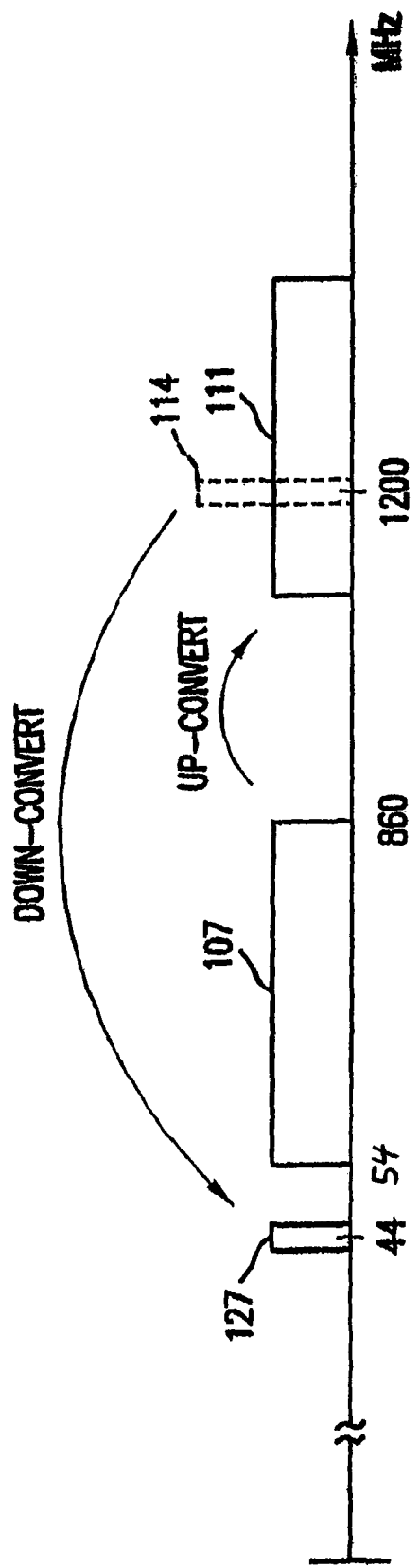
FIG. 1B illustrates the channel selection of the dual conversion tuner.

The operation of the tuner 134 is described as follows and in reference to FIG. 1B, where FIG. 1B represents the frequency spectrum of the particular signals that are operated on and generated by the tuner 134. The up-convert mixer 108 mixes the RF signal 107 with a LO signal 109 that is generated by the PLL 110. As discussed above and as shown in FIG 1B, the RF signal 107 can be a TV signal having a plurality of channels that occupy from 54 MHz to 860 MHz. Since the PLL 110 is tunable from 1270 to 2080 MHZ, the RF signal 107 is up-converted to a first IF 111 having a frequency that is above the 54-860 MHZ input frequency band. The first IF 111 is sent off-chip to the SAW filter 114, which has a narrow passband window centered at 1220 MHz, as discussed above. The first IF filter 114 selects a desired channel 115 that is within its narrow passband window, and substantially rejects all or the majority of the remaining channels, including an image channel or frequency. Therefore, a particular channel is selected by varying the frequency of the LO signal 109 so that the desired channel is up-converted into the narrow passband of the IF filter 114. The desired channel 115 (at 1220 MHZ) is sent back on-chip to the PGA 116, where the PGA 116 provides gain for the selected channel 115. The down-convert mixer 118 mixes the output of the PGA 116 with an LO signal from the PLL 124. The down-convert mixer 118 down-converts the desired channel 115 to an 44 MHZ IF signal 127 that appears at the IF output of the down-convert mixer 118. Finally, the IF signal 127 is filtered a second time by the bandpass SAW filter 130 to reject any unwanted frequency harmonics, producing the output IF signal 133 at 44 MHZ, or some other desired IF frequency or baseband, and carrying the information in the desired channel.

The specific frequencies mentioned in the description of the tuner assembly 100, and throughout this application, are given for example purposes only and are not meant to be limiting. Those skilled in the arts will recognize other frequency applications for the tuner assembly 100 based on the discussion given herein. These other frequency applications are within the scope and spirit of the present invention.

Furthermore, it is noted that the tuner 100 is configured for differential operation. For instance, the first mixer 108, the bandpass filter 114, the second mixer 118, the first LO signal 109, and the second LO signal 119 are all configured with differential inputs and outputs to reduce signal distortion. However, the present invention is not limited to differential operation, and can be implemented in single ended configurations.

As discussed above, the frequency of the first local oscillator 109 determines the channel selection by up-converting the frequency of the selected channel into the passband of the bandpass filter 114. In addition to the selected channel, the first local oscillator 109 generates higher order harmonics of the fundamental local oscillator frequency. These higher order harmonics can be partially passed by the bandpass filter 114, even though they are outside the passband of the bandpass filter 114. Once passed, the higher order harmonics can be further mixed in the second stage mixer 118 with harmonics from the second local oscillator 124, resulting in spurious signals that can fall in the passband of the second IF filter 130. When this occurs, the resulting spurious signals can interfere with the down-converted selected channel at the output of the second IF filter 130.

The local oscillator harmonics of interest can include the first, second, and third harmonics, etc., of the fundamental local oscillator frequencies of the first LO 110 and the second LO 124. Furthermore, various combinations of the first and second local oscillator harmonics can be mixed in the second mixer 118.

By experimentation, it has been found that the following harmonic combination is of particular significance for harmonic interference in dual conversion TV tuners, namely, $$IF_2-3 \text{ MHz} < |2 \cdot LO_1 - 3 \cdot LO_2| < IF_2+3 \text{ MHz} \qquad \text{Eq. 1}$$

In other words, for certain channel selections, the second harmonic of the first LO 110 minus the third harmonic of the second LO 124 falls in the passband of the second IF filter 130. As such, these mentioned mixer products can cause interference with the down-converted desired channel at the second IF (e.g. 36 MHz or 44 MHz). This can particularly occur for the selected channels in and around the 520 MHz and 560 MHz range in the RF input signal 101. The channels of 520 MHz and 560 MHz are a particular problem because the first LO 110 is set to a frequency of approximately 1740 MHz to select the 520 MHz channel, and 1780 MHz to select the 560 MHz channel. The second harmonics of 1740 MHz and 1780 MHz produce frequencies of 3480 MHz and 3560 MHz, respectively. The third harmonic of the second local oscillator at 1176 MHz occurs at approximately 3528 MHz. The difference of 3528 MHz with either 3480 MHz or 3560 MHz, results is a spurious frequency that fall in-band with the 44 MHz or 36 MHz second IF, which results in interference with the desired channel. The present invention addresses this concern.

In addition to the harmonic combination of Eq. 1, another harmonic combination that produces a spurious signal of interest is $|4 \cdot LO_1 - 5 \cdot_{LO2}|$.

In one embodiment, a relatively wideband first IF filter 114 is used, (e.g. approximately 4 channels wide) and the tuning step size of the first LO 110 is 10 MHz. When using a wideband first IF filter 114, the frequency of the first LO 110 can be tuned slightly until the harmonic spur mentioned above falls outside the passband of the second IF filter 130, so as to preclude the interference with the desired channel. When doing so, the frequency of the second LO 124 can be tuned by an equal and opposite amount to compensate for the tuning of the first LO 110 so that the desired channel is still down-converted to the second IF of 44 MHz.

For example, if the first LO is tuned by 10 MHz, then the desired channel will be shifted by 10 MHz off the center of the first IF filter 114, but will still fall in the passband of the first IF filter 114. To make up for this frequency shift, the second LO is tuned by 10 MHz in the opposite direction so that the desired channel is still down-converted to the correct second IF frequency (e.g. 44 MHz or 36 MHz). Performing such a procedure, can prevent harmonic spurs from interfering with the desired channel at the second IF frequency, and also insures that the desired channel is still down-converted to the correct second IF frequency.

This first method of spur elimination works well with a wideband first IF filter. For example, the first method of spur elimination works well with a wideband first IF filter 114 of approximately 4 channels, or 24 MHz wide for 6 MHz channel spacings. However, this method of spur elimination becomes more difficult with a narrow first IF filter of approximately 3 channels or less, because tuning the first LO 110 by 10 MHz can cause the desired channel to be up-converted outside the passband of the first IF filter 114.

Figure 2:
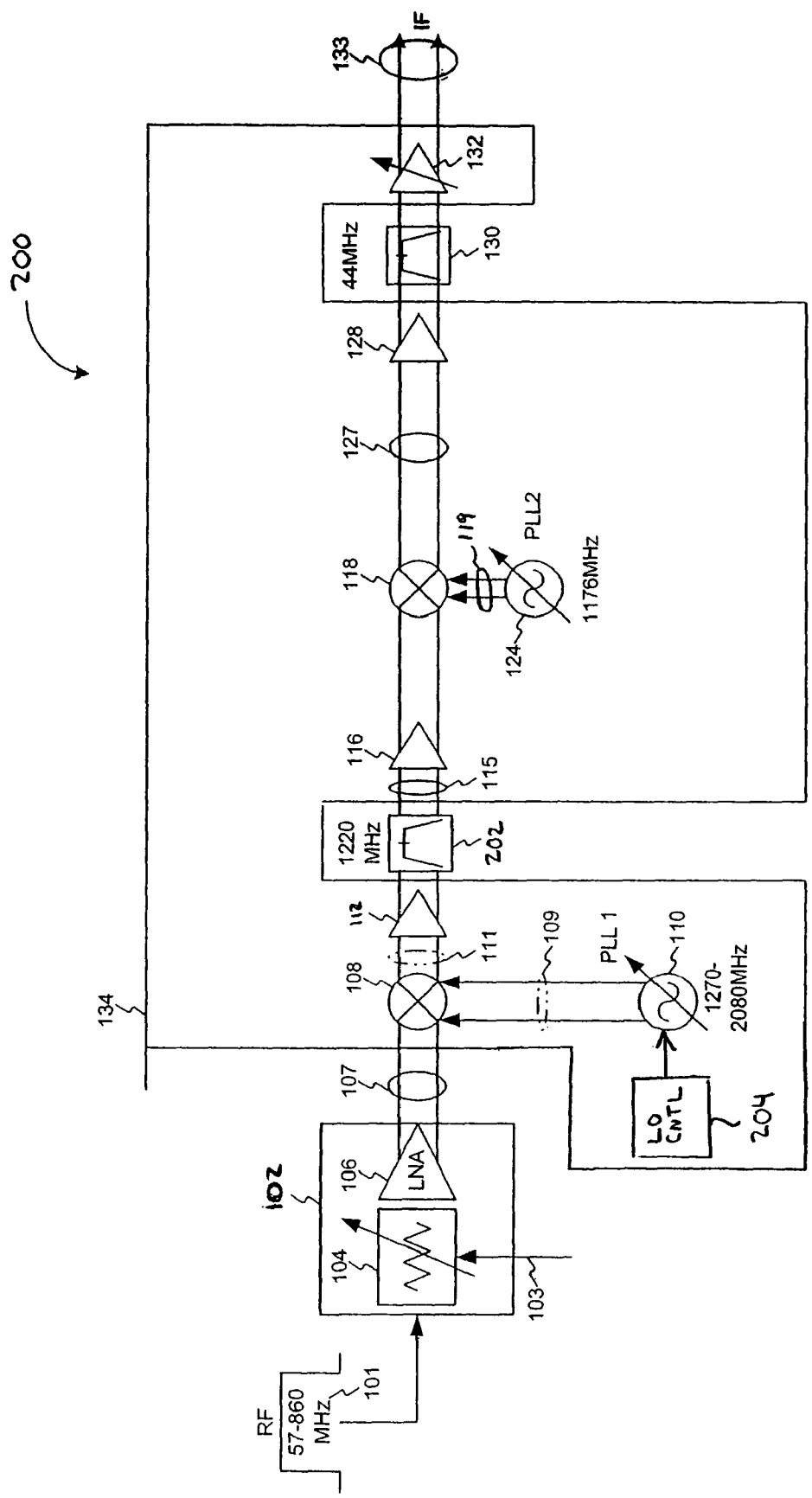
FIG. 2 illustrates a dual conversion receiver with a narrowband first IF filter and a first local oscillator with a frequency step size determined so that harmonic mixer products do not interfere with the second IF signal.

FIG. 2 illustrates a dual conversion tuner 200, having a first IF filter 202 that is a narrowband filter. For example, the first IF filter 202 can be approximately 3 channels wide, or less. As discussed above, tuning the first LO 110 in 10 MHz steps to remove LO harmonic interference is undesirable because the desired channel can shifted out of the passband of the IF filter 202. Instead, in one embodiment, the step size of the first LO is varied by an amount so as to shift the undesired harmonic spur out of the passband of the second IF filter 130. For example, the inventors have found that it is useful to set the step size to 10.35 MHz in order to shift the harmonic spur of Equation 1 out of the passband of the second IF filter 130. Other step sizes could be useful depending on the actual location of the spurious interference. In other words, one skilled in the art would recognize that other step sizes could be used besides 10.35 MHz.

A LO control circuit 204 is added to the dual conversion tuner 200 to control the step size of the first LO 110. The LO control circuit 204 selects the step size of the first LO 110 so that any spurious interference from the mixing of first LO 110 with the second LO 124 does not fall in the passband of the second IF filter 130. The step size that is chosen for the first LO 110 is selected based on the desired channel.

The passband of the filter 202 can vary from that which is expected due to temperature or tolerance variation. In other words, the center or width of the passband can shift with temperature or tolerance. In another embodiment, the LO control circuit 204 adjusts the fundamental frequency of the first LO 110 to compensate for passband variation so that the desired channel falls in the actual passband of the filter 202.

Figure 3:
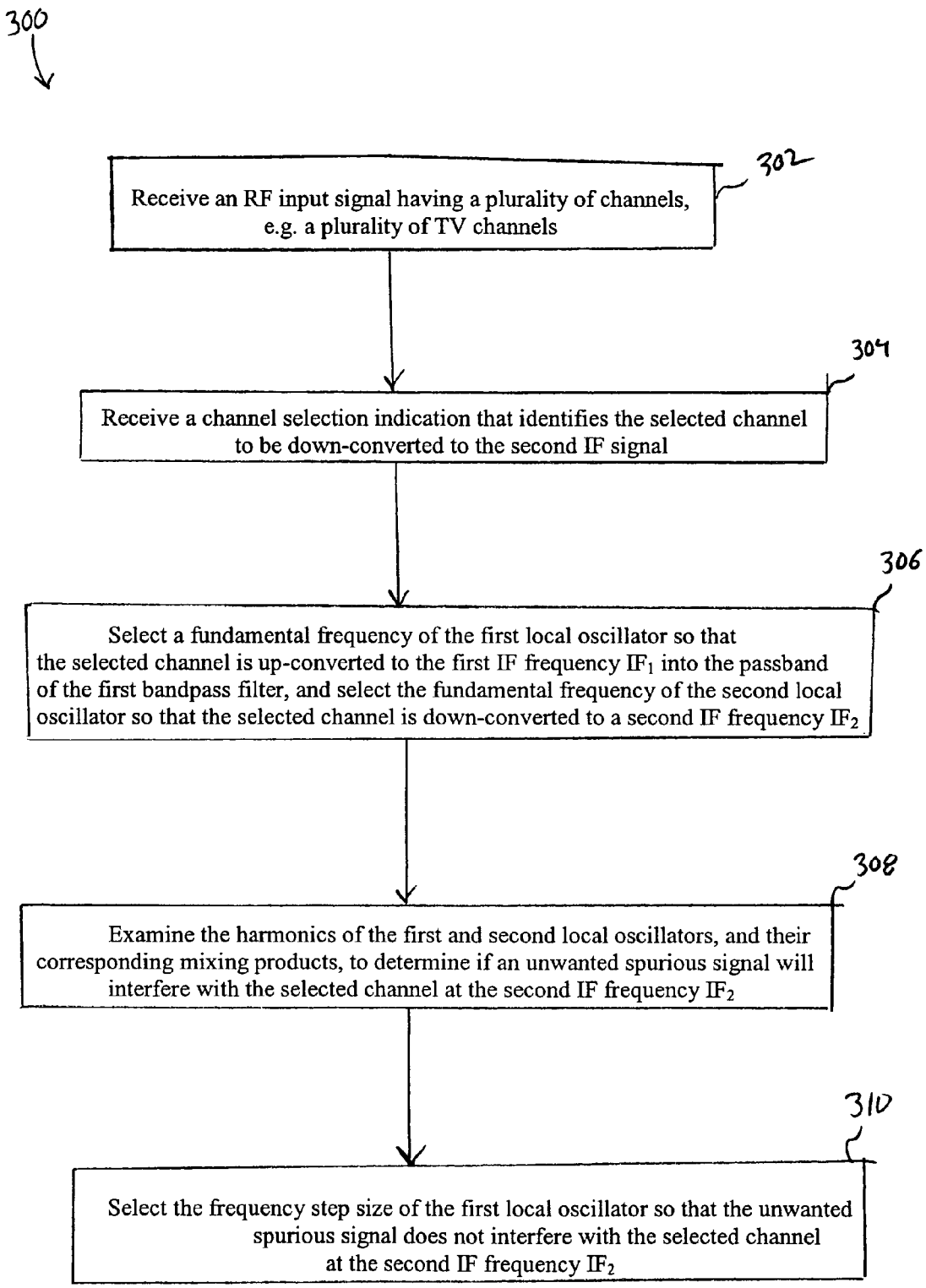
FIG. 3 illustrates a flowchart that further describes harmonic spur avoidance at the second IF frequency.

FIG. 3 illustrates a flowchart 300 that further describes the first and second local oscillator selection having corresponding first and second local oscillator frequencies in a dual conversion tuner so as to minimize spurious signal interference at second IF frequency, according to embodiments of the present invention.

In step 302, a RF input signal is received having a plurality of channels. For example, the RF input signal can include a plurality of TV channels.

In step 304, a channel selection indication is received that identifies the selected channel that is to be down-converted to the second IF signal, as shown in FIG. 1B. For example, the LO control circuit 204 receives a channel selection indication 206.

In step 306, a fundamental frequency of the first local oscillator 110 is selected so that the selected channel is up-converted to the first IF frequency $IF_1$ into the passband of the first bandpass filter 114, and the fundamental frequency of the second local oscillator 124 is selected so that the selected channel is down-converted to a second IF frequency $IF_2$.

In step 308, the harmonics of the first and second local oscillators, and their corresponding mixing products, are examined to determine if an unwanted spurious signal will interfere with the selected channel at the second IF frequency $IF_2$.

In step 310, the frequency step size of the first local oscillator 110 is selected so that the unwanted spurious signal does not interfere with the selected channel at the second IF frequency $IF_2$.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A dual conversion receiver, comprising:
a receiver input configured to receive an RF input signal having a plurality of channels;
a first mixer having a first input coupled to said receiver input and a second input coupled to a first local oscillator signal, said first mixer outputting a desired channel of said plurality of channels at a first IF frequency ($IF_1$);
a bandpass filter, having an input coupled to an IF output of said first mixer, and having a passband centered at $IF_1$ that passes said desired channel of said plurality of channels; and
a second mixer having a first input coupled to an output of the bandpass filter and a second input coupled to a second local oscillator signal, said second mixer outputting said desired channel at a second IF frequency ($IF_2$);
wherein a fundamental frequency of said first local oscillator signal is determined so that said desired channel falls in said passband of said bandpass filter;
wherein a frequency step size of said first local oscillator signal is set so that a spurious harmonic based on said first local oscillator signal and said second local oscillator signal does not interfere with said desired channel at said second IF frequency ($IF_2$); and wherein a frequency of said second local oscillator signal is held substantially constant over multiple channel selections, so that said second IF frequency ($IF_2$) is also held substantially constant for the desired channel at the output of the second mixer.

2. The dual conversion receiver of claim 1, wherein said spurious harmonic is based on a second harmonic of said first local oscillator signal and a third harmonic of said second local oscillator signal.

3. The dual conversion receiver of claim 1, wherein said spurious harmonic occurs at a frequency of:

$$|2 \cdot LO_1 - 3 \cdot LO_2|,$$

wherein $2 \cdot LO_1$ is a second harmonic of said frequency of said first local oscillator signal, and wherein $3 \cdot LO_2$ represents a third harmonic of a frequency of said second local oscillator signal.

4. The dual conversion receiver of claim 3, wherein said frequency step size of said first local oscillator signal is approximately 10.35 MHz.

5. The dual conversion receiver of claim 1, wherein said passband is approximately 3 channels wide.

6. The dual conversion receiver of claim 1, further comprising a second bandpass filter coupled to an output of said second mixer having a passband centered on said second IF frequency ($IF_2$), wherein said frequency step size of said first local oscillator signal is determined so that said spurious harmonic falls outside said passband of said second bandpass filter.

7. The dual conversion receiver of claim 1, wherein said first IF frequency ($IF_1$) occurs at approximately 1220 MHz, and said second IF frequency ($IF_2$) occurs at approximately at 44 MHz.

8. The dual conversion receiver of claim 1, wherein said second mixer is an image rejection mixer.

9. A dual conversion receiver, comprising:
a receiver input configured to receive an RF input signal having a plurality of channels;
a first mixer having a first input coupled to said receiver input and a second input coupled to a first local oscillator signal, said first mixer outputting a desired channel of said plurality of channels at a first IF frequency ($IF_1$);
a first bandpass filter, having an input coupled to an IF output of said first mixer, and having a passband centered at $IF_1$ that passes said desired channel; and
a second mixer having a first input coupled to an output of the bandpass filter and a second input coupled to a second local oscillator signal, said second mixer outputting said desired channel at a second IF frequency ($IF_2$);
a second bandpass filter having an input coupled to an IF output of said second mixer, and having a passband centered at $IF_2$ that passes said desired channel;
a first local oscillator producing said first local oscillator signal having a fundamental frequency that is tuned to select said desired channel from said plurality of channels, said first local oscillator signal also having first local oscillator harmonics of said fundamental frequency; and
a second local oscillator producing said second local oscillator signal having a fundamental frequency and second local oscillator harmonics of said fundamental frequency;
wherein a frequency step size of said first local oscillator is set so that a spurious signal generated from said first local oscillator harmonics and said second local oscillator harmonics falls outside said passband of said second bandpass filter; and wherein a frequency of said second local oscillator signal is held substantially constant over multiple channel selections so that said second IF frequency ($IF_2$) is also held substantially constant for the desired channel at the output of the second mixer.

10. The dual conversion receiver of claim 9, wherein said fundamental frequency of said second local oscillator signal is substantially fixed relative to said fundamental frequency of said first local oscillator signal.

11. The dual conversion receiver of claim 9, wherein said passband of said first bandpass filter is approximately 3 channels wide.

12. The dual conversion receiver of claim 9, wherein said spurious signal is based on a second harmonic of said fundamental frequency of said first local oscillator signal and a third harmonic of said fundamental frequency of said second local oscillator signal.

13. The dual conversion receiver of claim 12, wherein said spurious signal occurs at a frequency of:

$$|2 \cdot LO_1 - 3 \cdot LO_2|,$$

wherein $2 \cdot LO_1$ is said second harmonic of said fundamental frequency of said first local oscillator signal, and wherein $3 \cdot LO_2$ represents said third harmonic of said fundamental frequency of said second local oscillator signal.

14. The dual conversion receiver of claim 9, wherein said frequency step size of said first local oscillator is approximately 10.35 MHz.

15. In a dual conversion receiver having a first mixer that is driven by a first local oscillator and a second mixer that is driven by a second local oscillator, wherein said first and second mixers are coupled by a first bandpass filter for channel selection, and wherein a second bandpass filter is coupled to an output of the second mixer, a method of channel tuning so as to reduce spurious signal interference, comprising:
receiving a channel selection indication that identifies a selected channel;
selecting a fundamental frequency for the first local oscillator so that the selected channel is up-converted into a passband of the first bandpass filter, and selecting a fundamental frequency of the second local oscillator so that the selected channel is down-converted into a passband of the second bandpass filter; and
setting a frequency step size of said first local oscillator so that spurious signal interference based harmonics of said first local oscillator signal and said second local oscillator fall outside said passband of the second bandpass filter;
wherein a frequency of said second local oscillator signal is held substantially constant over multiple channel selections so that said second IF frequency ($IF_2$) is also held substantially constant for the desired channel at the output of the second mixer.

16. The method of claim 15, wherein said step of selecting a frequency step size comprises the step of selecting a frequency step size of said first local oscillator so that a spurious signal at $|2 \cdot LO_1 - 3 \cdot LO_2|$ falls outside said passband of said second bandpass filter, wherein $2 \cdot LO_1$ is a second harmonic of said fundamental frequency of said first local oscillator, and wherein $3 \cdot LO_2$ is a third harmonic of said fundamental frequency of said second local oscillator.

17. The method of claim 16, wherein said frequency step size is selected to be 10.35 MHz.

18. The method of claim 15, further comprising the step of examining harmonics of said first and second local oscillators, to determine if an unwanted spurious signal falls within said passband of said second bandpass filter.

19. The method of claim 18, further comprising the step of examining mixer products of first and second local oscillator signals, to determine if an unwanted spurious signal falls within said passband of said second bandpass filter.

20. The dual conversion receiver of claim 9, wherein said spurious signal occurs at a frequency of:

$$|4 \cdot LO_1 - 5 \cdot LO_2|,$$

wherein $4 \cdot LO_1$ is a fourth harmonic of said fundamental frequency of said first local oscillator signal, and wherein $5 \cdot LO_2$ represents a fifth harmonic of said fundamental frequency of said second local oscillator signal.

* * * * *